US010949286B2

(12) United States Patent
Volentine et al.

(10) Patent No.: US 10,949,286 B2
(45) Date of Patent: Mar. 16, 2021

(54) HANDLING MEMORY ERRORS IN MEMORY MODULES THAT INCLUDE VOLATILE AND NON-VOLATILE COMPONENTS

(71) Applicant: HEWLETT PACKARD ENTERPRISE DEVELOPMENT LP, Houston, TX (US)

(72) Inventors: Robert J. Volentine, Houston, TX (US); Frank L. Wu, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 322 days.

(21) Appl. No.: 15/540,232

(22) PCT Filed: Jan. 12, 2015

(86) PCT No.: PCT/US2015/010974
§ 371 (c)(1),
(2) Date: Jun. 27, 2017

(87) PCT Pub. No.: WO2016/114749
PCT Pub. Date: Jul. 21, 2016

(65) Prior Publication Data
US 2018/0004591 A1    Jan. 4, 2018

(51) Int. Cl.
*G06F 11/00* (2006.01)
*G06F 11/07* (2006.01)
*G06F 11/14* (2006.01)

(52) U.S. Cl.
CPC ........ *G06F 11/0793* (2013.01); *G06F 11/073* (2013.01); *G06F 11/079* (2013.01);
(Continued)

(58) Field of Classification Search
CPC ............. G06F 11/0751; G06F 11/0787; G06F 11/0793; G06F 11/1417; G06F 11/1441; G06F 11/2284
See application file for complete search history.

(56) References Cited

U.S. PATENT DOCUMENTS 6,513,114 B1 * 1/2003 Wu .................... G06F 9/4411
713/2
6,601,186 B1 * 7/2003 Fox ................... G06F 11/0709
714/4.12
(Continued)

OTHER PUBLICATIONS

NVM Programming Model (NPM), (Research Paper), Dec. 21, 2013, 85 Pages.

*Primary Examiner* — Elmira Mehrmanesh
(74) *Attorney, Agent, or Firm* — Sheppard Mullin Richter & Hampton LLP

(57) ABSTRACT

In one example in accordance with the present disclosure, a system for handling memory errors includes a memory module having volatile components and non-volatile components. The system includes a BIOS chip having BIOS code and a BIOS non-volatile (NV) memory. The BIOS NV memory stores error data associated with the memory module that was stored prior to a power-on or reset of the system. The system includes a processor to execute the BIOS code to, after the power-on or reset of the system end before an operating system is loaded; (1) read, from the BIOS NV memory, the error data; and (2) determine, based on the error data, whether to take a corrective action with respect to the memory module.

13 Claims, 5 Drawing Sheets

(52) U.S. Cl.
CPC ...... *G06F 11/0751* (2013.01); *G06F 11/0787* (2013.01); *G06F 11/1417* (2013.01)

(56) References Cited

U.S. PATENT DOCUMENTS

| | | | |
|---|---|---|---|
| 6,934,873 B2* | 8/2005 | Lu | G06F 11/1417 713/2 |
| 6,948,094 B2 | 9/2005 | Schultz et al. | |
| 7,017,062 B2* | 3/2006 | Poisner | G06F 1/206 713/320 |
| 7,035,953 B2* | 4/2006 | Krontz | G06F 11/0721 710/301 |
| 7,043,666 B2* | 5/2006 | Wynn | G06F 11/073 714/6.13 |
| 7,203,831 B2* | 4/2007 | Wu | H04L 41/082 713/100 |
| 7,243,222 B2* | 7/2007 | Rothman | G06F 11/3636 713/1 |
| 7,340,594 B2* | 3/2008 | First | G06F 11/0772 713/1 |
| 8,516,343 B2 | 8/2013 | Flynn et al. | |
| 8,566,639 B2 | 10/2013 | Moshayedi et al. | |
| 8,756,474 B2 | 6/2014 | Shibata et al. | |
| 8,874,831 B2 | 8/2014 | Lee et al. | |
| 8,880,791 B2 | 11/2014 | Chen et al. | |
| 9,542,195 B1* | 1/2017 | Astarabadi | G06F 9/4401 |
| 2003/0070115 A1* | 4/2003 | Nguyen | G06F 11/0787 714/23 |
| 2007/0300007 A1 | 12/2007 | Bulusu et al. | |
| 2009/0046512 A1 | 2/2009 | Halloush et al. | |
| 2013/0304980 A1 | 11/2013 | Nachimuthu et al. | |
| 2014/0013034 A1 | 1/2014 | Kwon et al. | |
| 2014/0032819 A1 | 1/2014 | Dang et al. | |
| 2014/0245384 A1 | 8/2014 | Shieh et al. | |
| 2014/0281152 A1 | 9/2014 | Karamcheti et al. | |
| 2014/0365758 A1* | 12/2014 | Chiang | G06F 9/4401 713/2 |

\* cited by examiner

HANDLING MEMORY ERRORS IN MEMORY MODULES THAT INCLUDE VOLATILE AND NON-VOLATILE COMPONENTS

BACKGROUND

Non-volatile (NV) DIMMs (dual in-line memory modules) are a technology that includes both volatile memory components (e.g., DRAM devices) and non-volatile memory components (e.g., Nand Flash). These NV DIMMs possess characteristics of both volatile memory devices and non-volatile memory devices. Data in volatile memory components of an NV DIMM is copied to the non-volatile components in various situations when power is lost to the memory module. Thus, overall, the data contained in these NV DIMMs is persistent and will be preserved following a power loss, power cycles and system resets.

BRIEF DESCRIPTION OF THE DRAWINGS

The following detailed description references the drawings, wherein.

DETAILED DESCRIPTION

As mentioned above, NV DIMMs are memory modules that include both volatile memory components (e.g., DRAM devices) and non-volatile memory components (e.g., Nand Flash). As mentioned, data in volatile memory components of an NV DIMM is copied to the non-volatile components in various situations when power is lost to the memory module. Upon restoration of power, data in the non-volatile memory components is copied back to the volatile components before startup of the system (e.g., before loading of an operating system). Thus, if there is bad data in the NV DIMM memory module, it may be reinstated upon power restoration.

In some situations, a system may simply proceed to use the reinstated data in its NV DIMMs when the system is powered on. In these situations, if the reinstated data is bad, the system may experience continuous system crashes, e.g., a cycle of using reinstated bad data, crashing, restarting, using reinstated bad data, and so on. Such a system may be unable to recover in this situation, and such a system may be unstable, at least until the bad NV DIMMs are removed from the system, in short, such a system may be unable to recover from errors in persistent data in memory modules of the system.

The present disclosure describes handling memory errors in memory modules that include volatile and non-volatile components (e.g., NV DIMMs). According to the present disclosure, in a system, a non-volatile memory of a BIOS chip may keep track of an error count with respect to memory modules of the system. Such error data may be stored previous to a power-on or reset (e.g., to include power loss, power failure, etc.) of the system, and may persist through a power on or reset of the system. After the power on or reset, as part of a memory initialization mode, BIOS code may be executed to read the error data from the BIOS non-volatile memory and, based on this error data, take a corrective action (e.g., reinitialization of the memory module) with respect to the memory module. The present disclosure may prevent bad data from being reinstated from non-volatile components of the memory module, and thus, according to the present disclosure, a system may recover from errors in persistent data of the system. Such a system will not get stuck in a cycle of using reinstated bad data, crashing, restarting, using reinstated bad data, and so on.

Figure 1:
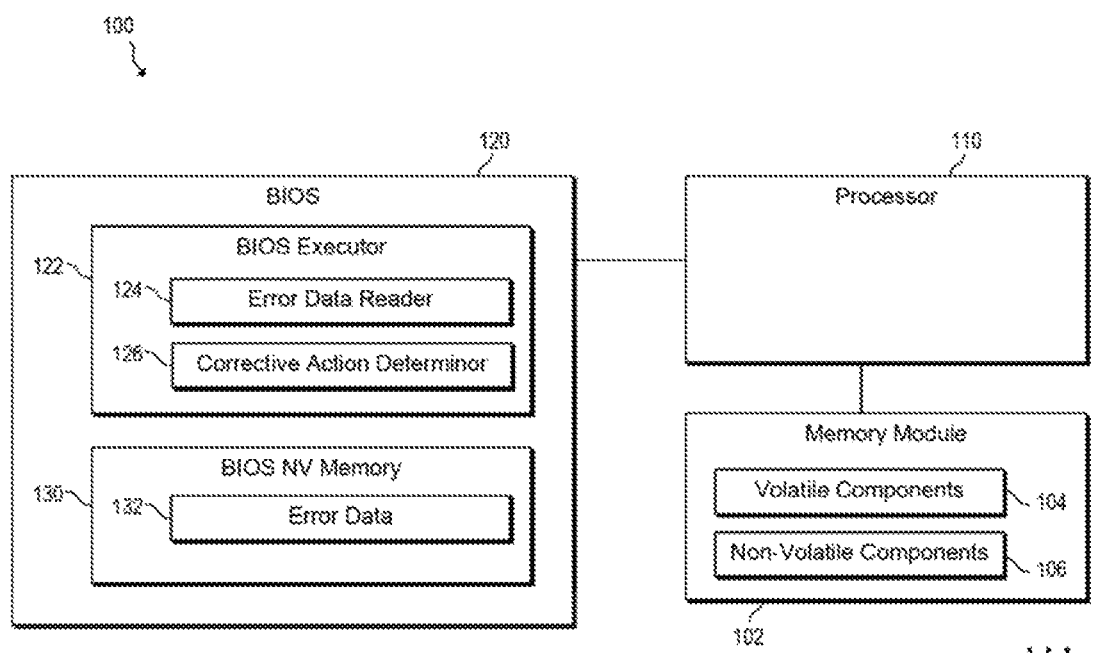
FIG. 1 is a block diagram of an example system for handling memory errors in memory modules that include volatile and non-volatile components.

FIG. 1 is a block diagram of an example system 100 for handling memory errors in memory modules that include volatile and non-volatile components. System 100 may be any computing device capable of using memory modules that include both volatile and non-volatile components. System 100 may include at least one memory module 102, a processor 110 end a BIOS (basic input/output system) chip 120. Memory module 102 may be in communication with processor 110, for example, via at least one link or bus (e.g., a memory bus). Processor 110 may be in communication with BIOS chip 120, for example, via at least one link or bus (e.g., a DMI link, a south bridge, etc.).

Memory module 102 may be any memory module that includes volatile components (e.g., 104) and non-volatile components (e.g., 106). Data in the volatile components 104 may copied to the non-volatile components 106 in various situations, for example, when power is lost to the memory module 102 (e.g., shut-down, reset, power loss, power failure, etc.). In various situations (e.g., upon restoration of power to memory module 102), data in the nonvolatile components 106 may be copied back to the volatile components 104. In some examples, this copying of data back to the volatile components may occur before startup of the system 100 (e.g., before loading of an operating system). Volatile components 104 may be any electronic, magnetic, optical, or other physical storage devices that require power to persistently store information. Thus, volatile components 104 may be, for example, Random Access Memory (RAM) or DRAM devices. Non-volatile components 106 may be any solid-state storage devices that do not require power to persistently store information. Thus, non-volatile components 108 may be Nand Flash, another type of Flash, or any other type of solid state storage device.

Processor 110 may be a central processing unit (CPU), microprocessor, and/or other hardware device suitable for retrieval and execution of instructions stored in a machine-readable storage medium, in the example of FIG. 1, processor 110 may retrieve instructions and/or data torn memory module 102 and/or from BIOS 120. As will be described in more detail below, processor 110 may fetch, decode, and execute instructions from BIOS 120 (particularly, from BIOS executor 122) to perform various solutions described herein, e.g., power-on routines, memory initialization routines, etc. In some examples of the present disclosure, BIOS 120 may include its own processor of sorts (e.g., part of BIOS executor 122) and may not need processor 110 to implement the functionality of BIOS executor 122. For simplicity, however, the present disclosure will primarily describe embodiments where processor 110 is used to implement the functionality of BIOS executor 122. It should be understood that the other mentioned examples where BIOS 120 includes its own processor of sorts are contemplated fey this disclosure.

BIOS (basic input/output system) chip 120 may be any programmable computer chip (e.g., firmware) that is used by the system during the booting process (e.g., power-on, startup, power cycle, etc.). The term "BIOS" may be used throughout this disclosure to refer to firmware chip 120; however, it should be understood that any firmware chip may be used, and the present disclosure is not limited to any official "BIOS" branded or labeled chip. BIOS chip 120 may include at least one programmable portion, e.g., BIOS executor 122 as shown in FIG. 1. BIOS chip 120 may also include at least one BIOS non-volatile (NV) memory (e.g., 130). BIOS NV memory 130 may store error data (e.g., 132) associated with memory modules (e.g., 102), as described in more detail below. BIOS NV memory 130 may be any solid-state storage device that does not require power to persistently store information. Thus, BIOS NV memory 130 may be Nand Flash, another type of Flash, or any other type of solid state storage device.

BIOS executor 122 may be implemented in the form of instructions (e.g., stored on a non-volatile machine-readable storage medium of BIOS 120) that, when executed (e.g., by processor 110), implement the functionality of the BIOS executor 122. In some examples, as mentioned above, BIOS 120 may not need processor 110 to implement the functionality of BIOS executor 122. For example, BIOS executor may include its own processor to execute instructions of BIOS executor 122. Alternatively or in addition, BIOS executor 122 may include electronic circuitry (i.e., hardware) that implements the functionality of the BIOS executor 122. If BIOS executor 122 is implemented in the form of instructions, BIOS executor 122 may be referred to as "BIOS code" in some examples.

BIOS executor 122 may include an error data reader 124 and a corrective action determiner 128. Each of these components may be implemented as instructions and/or as electronic circuitry (i.e., hardware), similar to the BIOS executor 122 overall, as described above.

Error data reader 122 may read, from BIOS NV memory 130, error data 132. Error data 132 is associated with memory module 102. Error data 132 was stored prior to a particular power-on or reset (e.g., to include power loss, power failure, etc.) of the system 100. The functionality of error data reader 122 as described herein may occur after this particular power-on or reset of the system 100 but before other boot routines of system 100 occur (e.g., before an operating system is loaded). More particularly, the functionality of error data reader 122 as described herein may occur as past of a memory initialization routine or mode performed by BIOS 120. As part of this memory initialization routine, BIOS 120 may check each memory module installed in system 100, including memory module 102. As part of this check, error data reader 122 may read the error data records for each memory module from BIOS NV memory 130.

Error data 132 may be stored in the form of at least one "record," and error data reader 124 may read this at least one record. BIOS NV memory 130 may store at least one record for each installed memory module in system 100. Error data 132 for memory module 102 will be described in more detail as an example, and it should be understood that error data for other memory modules may be similar. Error data 132 for memory module 102 may indicate an error count, for example, indicating the number of times memory module 102 has experienced an uncorrectable error, meaning memory module 102 somehow stored bad data that could not be corrected by an error correction procedure. The error count may indicate the number of times an uncorrectable error was detected (e.g., detected by processor 110) in memory module 102, or the number of times such an error caused a malfunction and/or reset of system 100. In short, the error count indicates a number of "problems" caused by memory module 102. Such problems could be caused by "bad data" stored in the memory modules or could be caused by a physical defect in the memory module itself. Various examples described herein may refer to the "bad data" example, but the solutions described herein may apply to the example of a physical defect in a memory module (e.g., 102) as well, or both situations in the same example.

Corrective action determiner 126 may determine, based on error data 132 read by error data reader 124, whether to take a corrective action with respect to memory module 102. If error data 132 indicates that a problem (e.g., a runtime uncorrectable error that occurred in a previous boot) was caused by memory module 102, corrective action determiner 128 may analyze the error count associated with memory module 102. The functionality of corrective action determiner 128 as described herein may occur after the particular power-on or reset of the system 100 mentioned above but before other boot routines of system 100 occur (e.g., before an operating system is loaded). More particularly, the functionality of corrective action determiner 128 as described herein may occur as part of a memory initialization routine performed by BIOS 120. Alternatively, the functionality of corrective action determiner 128 as described herein may occur after memory initialization (i.e., not technically part of memory initialization).

Corrective action determinor 128 may compare the error count to at least one defined threshold. Such a threshold may indicate the number of problems or errors that are allowed with respect to memory module 102 before a corrective action should be taken. In some examples, multiple thresholds may be defined. In such examples, corrective action determinor 126 may lake a first corrective action once a first threshold is reached or exceeded, and a second corrective action when a second threshold is reached or exceeded, and so on. The at least one threshold may be a user-selectable setting in BIOS 120.

Corrective action determinor 126 may detect that the number of problems (the error count) caused by memory module 102 reaches or exceeds a defined threshold and may determine what corrective action should be taken as a result. In one example, when a threshold is readied or exceeded, corrective action determinor 126 may determine that memory module 102 should be reinitialized. Such reinitialization is described in more detail below with respect to FIG. 2. In another example, when a threshold is reached or exceeded, corrective action determinor 126 may determine that memory module 102 should be disabled to prevent its future use. This may be desirable, for example, if it is suspected that errors in the memory module are being caused due to physical defects in the memory module instead of or in addition to the presence of had data previously written to the memory module. In another example, when various thresholds are reached or exceeded, corrective action determinor 126 may determine that the data (potentially bad or poisoned data) in the memory module should be used as normal nonetheless. In some examples, multiple thresholds may be used, and when a first threshold is reached or exceeded, corrective action determiner 126 may determine that memory module 102 should be reinitialized, and when a second threshold (e.g., a greater number than the first threshold) is reached or exceeded, memory module 102 should be disabled. The various determinations just described regarding what to do when various thresholds are reached may be based on at least one user-selectable setting in BIOS 120.

Figure 2:
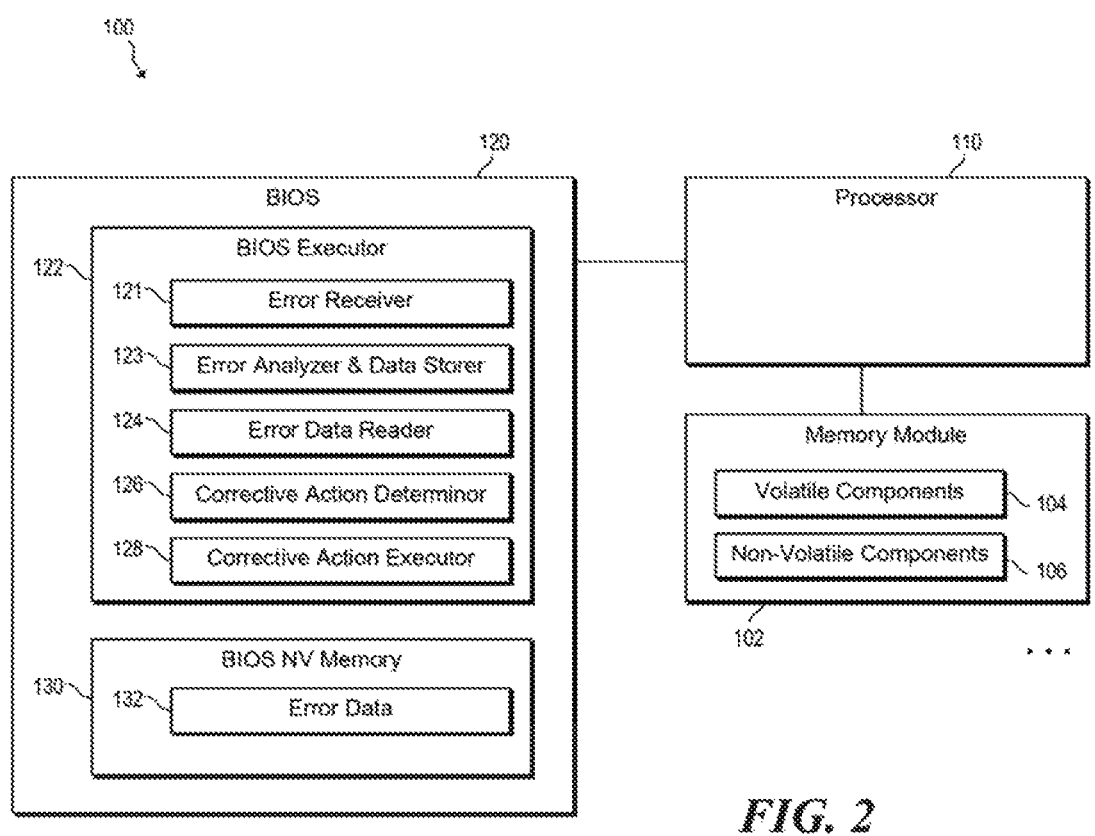
FIG. 2 is a block diagram of an example system for handling memory errors in memory modules that include volatile and non-volatile components.

FIG. 2 is a block diagram of the example system 100 for handling memory errors in memory modules that include volatile and non-volatile components. The example of system 100 in FIG. 2 may be similar to the example of system 100 in FIG. 1 in several respects. For example, like-named and like-numbered components in FIG. 2 may be similar to those described with regard to FIG. 1. In the example of FIG. 2, system 100 may include additional components that were not described with regard to FIG. 1.

BIOS executor 122 as shown in FIG. 2 may be similar to the BIOS executor described in FIG. 1. Here, BIOS executor 122 may additionally include an error receiver 121, an error analyzer and data storer 123 and a corrective action executor 128. Each of these components may be implemented as instructions and/or as electronic circuitry (i.e., hardware), similar to the BIOS executor 122 overall, as described above with regard to FIG. 1.

Error receiver 121 may receive indications of errors (e.g., uncorrectable errors, errors that cause system reset etc.) associated with memory modules (e.g., 102) of system 100. Such errors may be detected by processor 110 (e.g., by a memory controller of processor 110). Processor 110 may then send indications of such errors to BIOS executor 122, which may be executing in processor 110 or in BIOS 120 itself. The functionality of error receiver 121 as described herein may occur after a particular power-on or reset (e.g., to include power loss, power failure, etc.) of the system 100 but before other boot routines of system 100 occur (e.g., before an operating system is loaded). When error receiver 121 receives an indication of an error, a runtime error handler mode of BIOS executor 122 may be entered.

Error analyzer and data storer 123 may, as part of a runtime error handler mode, analyze errors received by error receiver 121. Error analyzer and data storer 123 may determine whether an error is an uncorrectable error and may determine whether the device containing such an uncorrectable error is a memory module with volatile and non-volatile components (e.g., an NV DIMM). If so, error analyzer and data storer 123 may store associated error data in BIOS NV memory 130. For example, error analyzer and data storer 123 may create or update error data 132 (e.g., a record for memory module 102) to indicate the number of uncorrectable errors detected for memory module 102. Such an update of error data 132 may include incrementing an existing count of errors for memory module 102. Thus, error data 132 may track the number of problems (e.g., uncorrectable errors, resets caused by errors, etc.) associated with memory module 102. Error data 132 created or updated by error analyzer and data storer 123 may be used later (e.g., after a subsequent boot, power on or restart of system 100) to detect whether memory module 102 experienced uncorrectable errors in previous boots.

Corrective action executor 128 may perform various corrective actions with regard to memory modules (e.g., 102), where the corrective action(s) were determined by corrective action determiner 128 of FIG. 1. Corrective action executor 128 may, in some situations, reinitialize an offending memory module (e.g., 102). To reinitialize a memory module, corrective action executor 128 may cause corrective data (e.g., zeros, pre-determined data, etc.) to be written to the memory module. More specifically, in some situations, corrective action executor 128 may cause corrective data to be written to the volatile components (e.g., 104) of the memory module (e.g., 102), instead of reinstating bad data of the memory module that was previously copied to the non-volatile components (e.g., 106). In these situations, this corrective data in the volatile components may be automatically copied to the non-volatile components upon a subsequent shutdown or restart of system 100, overwriting any bad data in the non-volatile components.

Corrective action executor 128 may, in other situations, disable an offending memory module (e.g., 102). To disable a memory module, corrective action executor 128 may set a flag stored in BIOS 120 that indicates that the memory module is not to be used in the future. Corrective action executor 128 may disable memory modules in other ways as well. Corrective action executor 128 may, in other situations, allow the bad data in the memory module to be used regardless of the errors detected in the memory module. As described above, the determinations of what corrective actions to take and when to take them (e.g., which thresholds) may be based on user-selectable settings in BIOS 120.

In some examples of the present disclosure, corrective action may be taken on a portion of a memory module that is smaller than the whole, for example, chip-level portions (e.g., at the chip level of memory module 102) or any logical sub-component of the memory module (e.g., page level, etc.). For example, corrective action executor 128 (part of BIOS executor 122) may reinitialize just an offending chip-level portion, page level portion, etc. of memory module 102. Specifically, corrective action executor 128 may reinitialize just a chip-level portion, page level portion, etc. of volatile components 104. To enable such smaller-portion corrective action, other components of BIOS executor 122 may need to function with respect to smaller portions as well. For example, error receiver 121 may receive error indications with respect to smaller portions of memory modules. Likewise, error analyzer and data storer 123 may store error data at a finer granularity (e.g., chip-level granularity, page level granularity, etc.). Specifically, error data may include a "record" for each of multiple chips, multiple pages, etc. of memory module 102. Finally, error data reader 124 and corrective action determinor 128 may also function with respect to smaller portions. For example, separate error counts at a chip-level, page level, etc. may independently be maintained and compared to thresholds.

Figure 3:
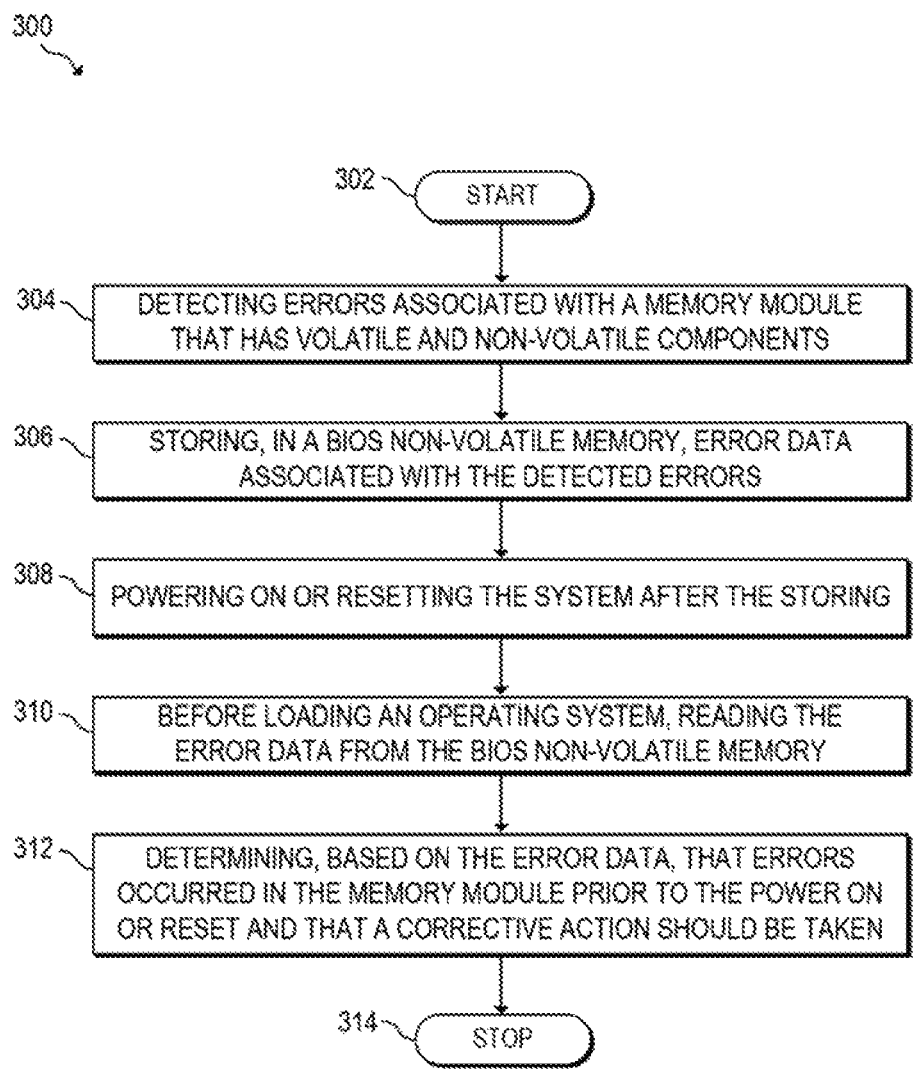
FIG. 3 is a flowchart of an example method for handling memory errors in memory modules that include volatile and non-volatile components.

FIG. 3 is a flowchart of an example method 300 for handling memory errors in memory modules that include volatile and non-volatile components. Method 300 may be described below as being executed or performed by a system, for example, system 100 of FIG. 1 or system 100 of FIG. 2. Other suitable systems and/or computing devices may be used as well. Method 300 may be implemented in the form of executable instructions stored on at least one machine-readable storage medium (e.g., in BIOS 120) of the system and executed by at least one processor (e.g., 110) of the system. Alternatively or in addition, method 300 may be implemented in the form of electronic circuitry (e.g., hardware). In alternate embodiments of the present disclosure, one or more steps of method 300 may be executed substantially concurrently or in a different order than shown in FIG. 3. In alternate embodiments of the present disclosure, method 300 may include more or less steps than are shown in FIG. 3. In some embodiments, one or more of the steps of method 300 may, at certain times, be ongoing and/or may repeat.

Method 300 may start at step 302 and continue to step 304, where the system may detect, by a processor (e.g., 110) of the system, errors associated with a memory module (e.g., 102) of the system. The memory module has volatile components and non-volatile components. At step 308, the system may store (e.g., via error analyzer and data storer 123), in a non-volatile memory (e.g., 130) of a firmware chip (e.g., BIOS chip 120) of the system, error data (e.g., 132) associated with the detected errors. At step 308, the system may power-on or reset (e.g., to include power loss, power failure, etc.), after the storing. At step 310, the system may, before loading an operating system, read (e.g., via error data reader 124) the error data from the non-volatile memory of the firmware chip. At step 312, they system may determine (e.g. via corrective action determinor 126), based on the error data, that errors occurred in the memory module prior to the power-on or reset and that a corrective action should be taken with respect to the memory module. Method 300 may eventually continue to step 314, where method 300 may stop.

Figure 4:
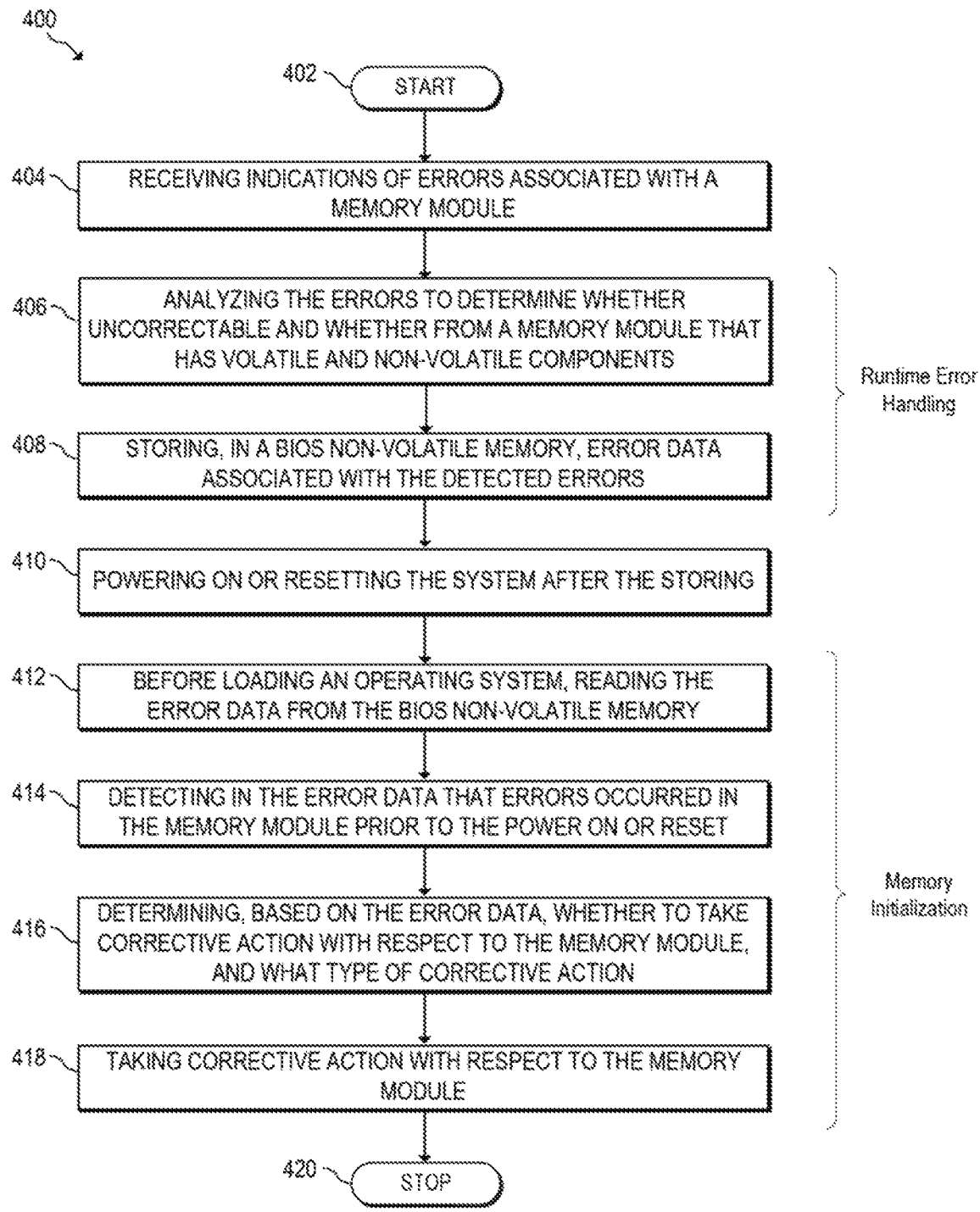
FIG. 4 is a flowchart of an example method for handling memory errors in memory modules that include volatile and non-volatile components.

FIG. 4 is a flowchart of an example method 400 for handling memory errors in memory modules that include volatile and non-volatile components. Method 400 may be described below as being executed or performed by a system, for example, system 100 of FIG. 1 or system 100 of FIG. 2. Other suitable systems and/or computing devices may be used as well. Method 400 may be implemented in the form of executable instructions stored on at least one machine-readable storage medium (e.g., in BIOS 120) of the system and executed by at least one processor (e.g., 110) of the system. Alternatively or in addition, method 400 may be implemented in the form of electronic circuitry (e.g., hardware). In alternate embodiments of the present disclosure, one or more steps of method 400 may be executed substantially concurrently or in a different order than shown in FIG. 4. In alternate embodiments of the present disclosure, method 400 may include more or less steps than are shown in FIG. 4. In some embodiments, one or more of the steps of method 400 may, at certain times, be ongoing and/or may repeat.

Method 400 may start at step 402 and continue to step 404, where the system may receive (e.g., via error receiver 121) indications of errors associated with a memory module. At this point a runtime error handler mode of BIOS executor 122 may be entered. Steps 406 and 408 may be executed during this runtime error handler mode. At step 406, the system may analyze (e.g., via error analyzer and data storer 123) the errors. Such analysis may include determining details about the errors, for example, what type of errors, whether they are uncorrectable, etc. Such analysis may also include determining whether the errors are from a memory module that has volatile components and non-volatile components (e.g., an NV DIMM). Such analysis may include isolating the errors to a particular memory module (e.g., 102), or even portions of the memory module, e.g., at a chip level. At step 408, the system may store or update (e.g., via error analyzer and data storer 123), in a BIOS NV memory (e.g., 130) error data associated with the detected errors. In particular, for each error, a "record" for the associated memory module (or smaller portion) may be created or updated in the BIOS NV memory. The created or updated record(s) may indicate, for the memory module (or smaller portion), a number (i.e., count) of problems (e.g., uncorrectable errors).

At step 410, the system may power on (e.g., after a power-down) or reset. After step 410, the system may enter a memory initialization mode where the memory modules installed in the system are initialized, including the memory module mentioned above. Steps 412, 414, 416, 418 may be executed during this memory initialization mode. At step 412, before an operating system is loaded, the system may read (e.g., via error data reader 124) the error data from the BIOS NV memory (e.g., 130), in particular, the system may read the various records associated with the memory module. At step 414, the system may detect, in the error data (e.g., 132), that errors occurred in the memory module prior to the power on or reset. At step 416, the system may determine (e.g., via corrective action determiner 126), based on fee error data, whether to take corrective action with respect to the memory module, and what type of corrective action to take, as described in more detail above. For example, if the error count for the memory module is above a defined threshold, as described above, a corrective action (e.g., reinitialization of the memory module or a smaller portion) may be determined. Also, as part of step 418, at least one user-selectable setting in BIOS 120 may be checked to determine a corrective action. At step 418, the system may take the corrective action (or not take if) with respect to the memory module, based on the determination made at step 418. Once any corrective action that is to be taken is taken with respect to any memory modules that are to be initialized in the system, the rest of the system boot process may continue, including loading an operating system, etc. Method 400 may eventually continue to step 420, where method 400 may stop.

Figure 5:
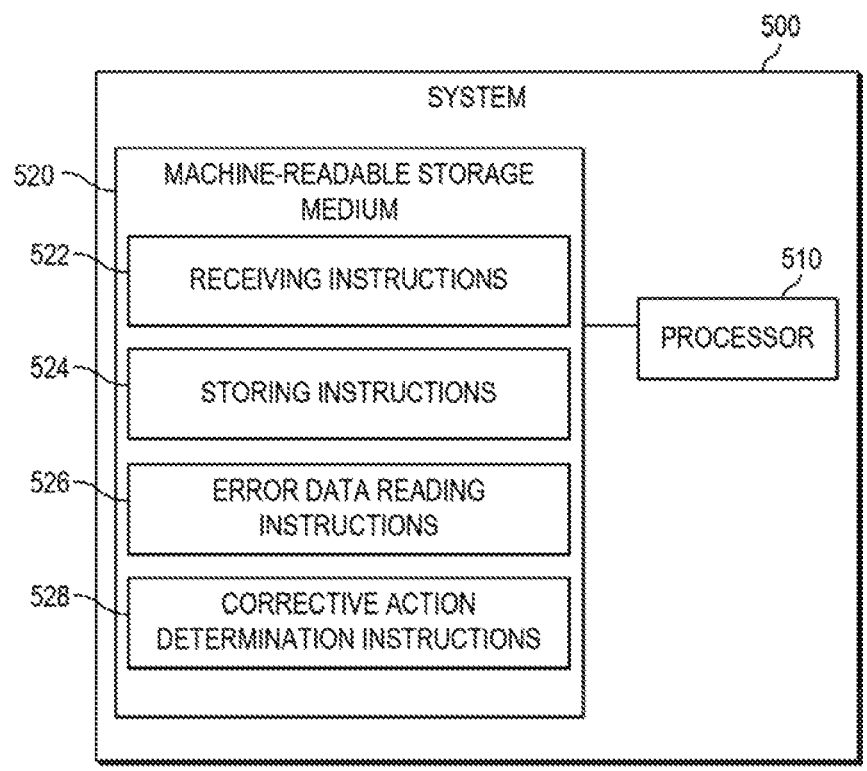
FIG. 5 is a block diagram of an example system for handling memory errors in memory modules that include volatile and non-volatile components.

FIG. 5 is a block diagram of an example system 500 for handling memory errors in memory modules that include volatile and non-volatile components. System 500 may be any computing device capable of using memory modules that include both volatile and non-volatile components. System 500 may be similar to system 100 of FIG. 1 or system 100 of FIG. 2, for example. In the embodiment of FIG. 5, system 500 includes a processor 510 and a machine-readable storage medium 520. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 510 may be a central processing unit (CPU), microprocessor, and/or other hardware device suitable for retrieval and execution of instructions stored in machine-readable storage medium 520. Processor 510 may be similar to processor 110 or may be a processor included inside BIOS 120. In the particular embodiment shown in FIG. 5, processor 510 may fetch, decode, and execute instructions 522, 524, 528, 528 to handle memory errors in memory modules that include volatile and non-volatile components. As an alternative or in addition to retrieving and executing instructions, processor 510 may include one or more electronic circuits comprising a number of electronic component for performing the functionality of one or more of the instructions in machine-readable storage medium 520. With respect to the executable instruction representations (e.g., boxes) described and shown herein, it should be understood that part or all of the executable instructions and/or electronic circuits included within one box may, in alternate embodiments, be included in a different box shown in the figures or in a different box not shown.

Machine-readable storage medium 520 may be any solid-state storage device that does not require power to persistently store information. Thus, machine-readable storage medium 520 may be Nand Rash, another type of Flash, or any other type of solid state storage device. Machine-readable storage medium 520 may be disposed within system 500, as shown in FIG. 5. In this situation, the executable instructions may be "installed" on the system 600. Alternatively, machine-readable storage medium 520 may be a portable, external or remote storage medium, for example, that allows system 500 to download the instructions from the portable/external/remote storage medium. In this situation, the executable instructions may be part of an "installation package". As described herein, machine-readable storage medium 520 may be encoded with executable instructions for handling memory errors in memory modules that include volatile and non-volatile components.

Referring to FIG. 5, receiving instructions 522, when executed by a processor (e.g., 510), may cause system 500 to receive indications of errors associated with a memory module of the system. The memory module has volatile components and non-volatile components. Storing Instructions 524, when executed by a processor (e.g., 510), may cause system 500 to store, prior to a power-on or reset of the system, in a BIOS non-volatile memory of the system, error data associated with the errors. Error data reading instructions 526, when executed by a processor (e.g., 510), may cause system 500 to, after the power-on or reset and before loading an operating system, read the error data from the BIOS non-volatile memory. Corrective action determination instructions 528, when executed by a processor (e.g., 510), may cause system 500 to determine, based on the error data, whether to take a corrective action with respect to the memory module.

The invention claimed is:

1. A system for handling memory errors, the system comprising:
   a memory module having volatile components and non-volatile components;
   a BIOS chip separate from the memory module having BIOS code and a BIOS non-volatile (NV) memory, wherein the BIOS NV memory stores error data associated with the memory module that was stored prior to a power-on or reset of the system; and
   a processor to execute the BIOS code to, after the power-on or reset of the system and before an operating system is loaded:
      read, from the BIOS NV memory, the error data, wherein the error data comprises a count of resets of the system caused by the memory module;
      determine, based on the error data, whether to take a corrective action with respect to the memory module; and
      take the corrective action which is to cause data in the memory module to be reinitialized by writing corrective data to the volatile components of the memory module.

2. The system of claim 1, wherein causing data in the memory module to be reinitialized includes causing the volatile components in the memory module to be reinitialized, and wherein the memory module, upon reset, power-down, power loss or power failure, causes data in the volatile components to be copied to the non-volatile components.

3. The system of claim 1, wherein the processor executes the BIOS code further to take the corrective action which is to disable the memory module and prevent its further use by the system.

4. The system of claim 1, wherein the error data includes a count of uncorrectable errors caused by the memory module, and wherein the determination of whether to take corrective action includes comparing the count to a defined threshold.

5. The system of claim 1, wherein the determination of whether to take the corrective action with respect to the memory module is further based on at least one user-selectable setting stored in the BIOS chip.

6. The system of claim 1, wherein the processor executes the BIOS code further to determine what type of corrective action to take with respect to the memory module, and wherein this determination is based on at least one user-selectable setting stored in the BIOS chip.

7. The system of claim 1, wherein the processor executes the BIOS code to, prior to the power-on or reset of the system, store or update, in the BIOS NV memory, the error data.

8. The system of claim 7, wherein the store or update of the error data is based on detected errors associated with the memory module during runtime, prior to the power-on or reset of the system.

9. A method for handling memory errors, the method comprising:
   detecting, by a processor of a system, errors associated with a memory module of the system, the memory module having volatile components and non-volatile components;
   storing, in a non-volatile memory of a firmware chip of the system, error data associated with the detected errors, wherein the firmware chip is separate from the memory module;
   powering-on or resetting the system after the storing;
   before loading an operating system, reading the error data from the non-volatile memory of the firmware chip, wherein the error data comprises a count of resets of the system caused by the memory module;
   determining, based on the error data, that errors occurred in the memory module prior to the power-on or reset and that a corrective action should be taken with respect to the memory module; and
   taking the corrective action which is to cause data in the memory module to be reinitialized by writing corrective data to the volatile components of the memory module.

10. The method of claim 9, wherein the storing is done based on a determination that the memory module is a particular type of memory module that includes volatile and non-volatile components.

11. The method of claim 9, wherein the storing is done based on a determination that the detected errors are uncorrectable errors.

12. A machine-readable storage medium encoded with instructions for handling memory errors, the instructions executable by a processor of a system to cause the system to:
   receive indications of errors associated with a memory module of the system, the memory module having volatile components and non-volatile components;
   store, prior to a power-on or reset of the system, in a BIOS non-volatile memory of the system, error data associated with the errors, wherein the BIOS non-volatile memory is separate from the memory module;
   after the power-on or reset and before loading an operating system, read the error data from the BIOS non-volatile memory, wherein the error data comprises a count of resets of the system caused by the memory module; and
   determine, based on the error data, whether to take a corrective action with respect to the memory module;
   wherein the error data includes a count of a number of errors caused by the memory module, and
   wherein the determination is to reinitialize the memory module if the counter is greater than a defined threshold and wherein the corrective action comprises writing corrective data to the volatile components of the memory module.

13. The machine-readable storage medium of claim 12, wherein the determination is further to disable the memory module if the counter is greater than a second defined threshold.

\* \* \* \* \*